(12) United States Patent
Fujiwara

(10) Patent No.: US 8,858,088 B2
(45) Date of Patent: Oct. 14, 2014

(54) TAPERED ROLLER BEARING AND METHOD OF DESIGNING THE SAME

(75) Inventor: Hiroki Fujiwara, Kuwana (JP)

(73) Assignee: NTN Corporation, Osaka (JP)

( * ) Notice: Subject to any disclaimer, the term of this patent is extended or adjusted under 35 U.S.C. 154(b) by 132 days.

(21) Appl. No.: 13/138,873

(22) PCT Filed: Apr. 16, 2010

(86) PCT No.: PCT/JP2010/056828
§ 371 (c)(1),
(2), (4) Date: Oct. 13, 2011

(87) PCT Pub. No.: WO2010/122955
PCT Pub. Date: Oct. 28, 2010

(65) Prior Publication Data
US 2012/0033909 A1 Feb. 9, 2012

(30) Foreign Application Priority Data
Apr. 24, 2009 (JP) .................................. 2009-105854

(51) Int. Cl.
*F16C 19/36* (2006.01)
*F16C 33/58* (2006.01)
*F16C 33/36* (2006.01)

(52) U.S. Cl.
CPC ............... *F16C 33/36* (2013.01); *F16C 19/364* (2013.01); *F16C 2240/50* (2013.01)
USPC ........... 384/568; 384/571; 384/619; 384/622; 384/450

(58) Field of Classification Search
USPC .......... 384/548, 565, 568, 571, 450, 619, 622
See application file for complete search history.

(56) References Cited

U.S. PATENT DOCUMENTS

| 4,929,098 | A | * | 5/1990 | Takata et al. .................. 384/450 |
| 6,390,685 | B1 | | 5/2002 | Shimomura et al. |
| 2010/0027932 | A1 | | 2/2010 | Fujiwara |
| 2011/0091145 | A1 | * | 4/2011 | Ito ................................. 384/565 |

FOREIGN PATENT DOCUMENTS

| CN | 2934723 Y | 8/2007 |
| CN | 201196204 Y | 2/2009 |
| EP | 1956255 A1 * | 8/2008 |
| JP | 3-12015 | 2/1991 |

(Continued)

OTHER PUBLICATIONS

Written Opinion of the International Searching Authority mailed Dec. 1, 2011 issued in corresponding International Patent Application No. PCT/JP2010/056828.
Japanese Notification of Reasons for Refusal dated Feb. 12, 2013, in corresponding Japanese Patent Application No. 2009-105854.
International Search Report for PCT/JP2010/056828 mailed Jul. 6, 2010.

(Continued)

*Primary Examiner* — Marcus Charles

(57) ABSTRACT

In a tapered roller bearing assembly, a crowning profile formed portion of the roller rolling surface is made up of a contact area crowned portion, which is held in contact with an inner ring raceway surface, and a non-contact area crowned portion which is held in non-contact with the inner ring raceway surface. The contact area crowned portion and the non-contact area crowned portion have their generatrices extending in an axial direction of a roller, which generatrices are represented by corresponding continuous lines represented by different functions and continued smoothly at a point of connection, and the curvature of the generatrix of the non-contact area crowned portion in the vicinity of the connection point is chosen to be smaller than the curvature of the generatrix of the contact area crowned portion.

10 Claims, 4 Drawing Sheets

(56) References Cited

FOREIGN PATENT DOCUMENTS

| | | |
|---|---|---|
| JP | 4-351314 | 12/1992 |
| JP | 8-232960 | 9/1996 |
| JP | 2000-346078 | 12/2000 |
| JP | 2001-65574 | 3/2001 |
| JP | 2006-52790 | 2/2006 |
| JP | 2008-248993 | 10/2008 |
| WO | 2008/056563 | 5/2008 |

OTHER PUBLICATIONS

Extended and Supplementary European Search Report issued Oct. 2, 2012 in corresponding European Patent Application No. 10767012.7.
Chinese Office Action issued Apr. 3, 2013 in corresponding Chinese Patent Application No. 201080017858.9.
Chinese Office Action issued Sep. 22, 2013 in corresponding Chinese Application No. 201080017858.9.

* cited by examiner $a: C \times x + D$ (ARBITRARY AT $0 \leq x \leq 1$)
$l: B + C + D$
$zm: F$

TAPERED ROLLER BEARING AND METHOD OF DESIGNING THE SAME

CROSS REFERENCE TO RELATED APPLICATIONS

This application claims the benefit under 35 U.S.C. Section 371, of PCT International Application No. PCT/JP2010/056828, filed Apr. 16, 2010, which claimed priority to Japanese Application No. 2009-105854, filed Apr. 24, 2009 in the Japanese Patent Office, the disclosures of which are hereby incorporated by reference.

BACKGROUND OF THE INVENTION

1. Field of the Invention

The present invention relates to a tapered roller bearing for supporting a rotating component of various machines and equipments and a method of designing the same. More particularly, the present invention relates to a crowning profile of a roller rolling surface in the tapered roller bearing.

2. Description of Related Art

The crowning profile in the tapered bearing assembly may be defined in any one of an inner ring, an outer ring and a plurality of rolling elements (rollers), and suggestions have been hitherto made to define the principal crowning profile in rolling elements (such as disclosed in the patent document 1 listed below) or in the inner and outer rings (such as disclosed in the patent document 2 listed below). The crowning profile referred to above hitherto suggested is generally designed in a combination of arcuate and rectilinear lines, but it has also been known that if a curved line expressed by a logarithmic function or an approximated curve thereof is used in designing the crowning profile, not only a reduction in contact pressure and/or stress at a contact area, but also an extended life can be obtained as compared with those available with the use of any other curved lines (such as disclosed in any one of the patent documents 3, 4 and 5 listed below).

PRIOR ART LITERATURE

[Patent Document 1] JP Laid-open Patent Publication No. H08-232960
[Patent Document 2] JP Laid-open Patent Publication No. H04-351314
[Patent Document 3] JP Laid-open Patent Publication No. 2000-346078
[Patent Document 4] JP Laid-open Patent Publication No. 2001-65574
[Patent Document 5] JP Laid-open Patent Publication No. 2006-52790

Since the contact pressure at the contact area is apt to be higher at an area between the roller and the inner ring than at an area between the rollers and the outer ring, the principal crowning profile is preferably employed in the inner ring. If the crowning profile expressed by the logarithmic function (which profile is hereinafter referred to as "logarithmic crowning profile") is employed in the inner ring, there is a likelihood that because of the presence of collars each at one end of the raceway surface defined in the inner ring with respect to the axial direction of the inner ring, the finishing grindstone will not work sufficiently on areas of the raceway surface adjacent the opposite ends thereof, where the amount of drop in finishing the crowning profile is large, resulting in a machining defect.

In view of the above, the logarithmic crowning profile referred to above is accordingly employed in each of the rollers. In general, since each of the rollers has a rolling surface that is longer than the inner ring raceway surface, no contact with the inner ring occurs at the opposite ends of the respective roller. It has, however, been found that the conventional design of the logarithmic crowning profile results in that the entire crowning profile is expressed by the logarithmic curve and, therefore, the amount of drop at the opposite ends each of the rollers, where the rollers does not contact the inner ring, is larger than needed, resulting in an increase of the grinding amount. Even with the crowning profile depicted by a single arcuate line (an arc), the drop amount tends to become excessive at the roller opposite ends.

SUMMARY OF THE INVENTION

In view of the foregoing, an object of the present invention is to provide a tapered roller bearing assembly, in which not only the contact pressure but also the stress at the contact area is reduced to increase the working lifetime of the bearing assembly and, also, the machining defect, which would occur in the raceway surface, is kept from occurring to allow the drop amount at the opposite ends of each of the rollers to be reduced to thereby increase the machining efficiency. The present invention is also intended to provide a method of designing such roller bearing assembly.

In order to accomplish the foregoing objects, the present invention in accordance with one aspect thereof provides a tapered roller bearing assembly of a type including inner and outer rings and a plurality of rollers, in which a crowning profile is formed in a roller rolling surface in an outer periphery of at least each roller; a crowning profile formed portion of the roller rolling surface is made up of a contact area crowned portion, which lies within an axial range of an inner ring raceway surface and is held in contact with the inner ring raceway surface, and a non-contact area crowned portion which lies outside the axial range of the inner ring raceway surface and is held in non-contact with the inner ring raceway surface; the contact area crowned portion and the non-contact area crowned portion have their generatrices extending in an axial direction of the roller, which generatrices are represented by corresponding continuous lines represented by different functions and continued smoothly at a point of connection; and the curvature of the generatrix of the non-contact area crowned portion in the vicinity of the connection point is chosen to be smaller than the curvature of the generatrix of the contact area crowned portion.

The term "continued smoothly" hereinabove and hereinafter used is intended to means that two elements are continued to each other with no angle formed therebetween and, in the context of the present invention, it means that the generatrix of the contact area crowned portion and the generatrix of the non-contact area crowned portion are ideally continued to each other so as to have a common tangential line at the point of connection, that is, those two generatrices represent a continuously differentiable function at the connection point.

According to the present invention, since the crowning profile is employed in the roller rolling surface in the outer periphery of the roller, as compared with the crowning profile employed only in the inner ring raceway surface, the grindstone can sufficiently work on the roller rolling surface to the extent needed. Accordingly, any possible processing defect to the rolling surface can be prevented. Thanks to the crowning profile formed in the roller rolling surface, the contact pressure and the stress at the contact area can be reduced to increase the working lifetime of the tapered roller bearing assembly. Also, since the curvature of the generatrix of the non-contact area crowned portion in the vicinity of the point of connection between the contact area crowned portion and the non-contact area crowned portion is smaller than the curvature of the generatrix of the contact area crowned portion, the drop amount at each of the opposite ends of the roller can be reduced. Accordingly, the grinding amount can be suppressed as compared with that in, for example, the single arcuate crowning profile hitherto employed and the machining efficiency of the roller can be increased to allow the cost of manufacture to be reduced.

The generatrix of the non-contact area crowned portion referred to above may have one or both of portions at a large and small diameter sides, which is/are represented by an arcuate line. In such case, the drop amount can be reduced as compared with the case in which the generatrix of the roller rolling surface in its entirety is represented by, for example, the logarithmic curve. Accordingly, the grinding amount can be reduced.

Alternatively, the generatrix of the non-contact area crowned portion may have one or both of portions at a large and small diameter sides, which is/are represented by a straight line. In this case, the drop amount can further be reduced as compared with the case in which the generatrix of the non-contact area crowned portion is represented by the arcuate line.

A portion or the whole of the generatrix of the contact area crowned portion referred to above may be represented by a logarithmic crowning profile. Thanks to the contact area crowned portion expressed by the logarithmic crowning profile, the contact pressure and the stress at the contact area can be reduced to increase the service life of the tapered roller bearing assembly.

The generatrix of the contact area crowned portion may be expressed by a straight portion, formed in a flat shape along an axial direction of the roller, and a portion formed by a logarithmic curve of the logarithmic crowning profile.

So that the machining accuracy of the crowning profile can be secured, the straight portion referred to above preferably has a length which is ½ or more of the entire length of the roller.

Of the generatrix of the non-contact area crowned portion, a connection with a portion formed by a logarithmic curve of the logarithmic crowning profile may be matched with the gradient of the logarithmic curve. In such case, the generatrix of the contact area crowned portion and the generatrix of the non-contact area crowned portion can be continued further smoothly at the point of connection.

The generatrix of the contact area crowned portion may be formed by a logarithmic curve of the logarithmic crowning profile expressed by the following formula:

$$z(y) = A\ln \frac{1}{1-\left\{1-\exp\left(-\frac{z_m}{A}\right)\right\}\left(\frac{y-a}{K_2 a}+1\right)^2}$$

wherein:

A represents $2K_1 Q/\pi/E'$;

a represents the effective length of the observatory site (as defined in FIG. 1);

E' represents the equivalent Young's modulus;

$K_1$ represents a design parameter for the crowning profile, which in turn represents a value descriptive of the multiplication of the design load Q and which also represents a value geometrically descriptive of the extent of curvature of the crowned portion;

$K_2$ represents a design parameter for the crowning profile, which in turn represents a value descriptive of the proportion of the crowning length relative to the effective length a of the observatory site;

l represents the effective length (as defined in FIG. 1);

Q represents the load in the normal direction;

y represents the position of the contact area in the direction of the generatrix;

z(y) represents the drop amount at the axial position y; and $z_m$ represents a design parameter for the crowning profile (as defined in FIG. 1), which in turn represents the drop amount at the effective length end.

In the formula recited above, at least parameters $K_1$ and $z_m$ may be optimally designed by the use of a mathematical optimization technique.

A crowning profile may be formed in the inner ring raceway surface and the sum of a drop amount of the crowning profile of the inner ring raceway surface and a drop amount of the crowning profile of an outer periphery of the roller may be chosen to attain a predetermined value.

The present invention in accordance with another aspect thereof also provides a method of designing a tapered roller bearing assembly for designing the tapered roller bearing assembly comprising inner and outer rings and a plurality of rollers, in which a crowning profile in a roller rolling surface in an outer periphery of at least each roller is formed, in which a crowning profile formed portion of the roller rolling surface is made up of a contact area crowned portion, which lies within an axial range of an inner ring raceway surface and is held in contact with the inner ring raceway surface, and a non-contact area crowned portion which lies outside the axial range of the inner ring raceway surface and is held in non-contact with the inner ring raceway surface; the contact area crowned portion and the non-contact area crowned portion have their generatrices extending in an axial direction of the roller, which generatrices are represented by corresponding continuous lines represented by different functions and continued smoothly at a point of connection; the generatrix of the contact area crowned portion is formed by the logarithmic curve of the logarithmic crowning profile expressed by the previous formula; and the curvature of the generatrix of the non-contact area crowned portion in the vicinity of the connection point is chosen to be smaller than the curvature of the generatrix of the contact area crowned portion.

According to the designing method of the present invention, the tapered roller bearing assembly capable of reducing the contact pressure and the stress at the contact area to increase the long service life can be designed easily. Also, the tapered roller bearing assembly of a kind that can be manufactured at a reduced cost while the drop amount is reduced can be designed.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

A first preferred embodiment of the present invention will be described in detail with particular reference to FIGS. 1 to 3B.

Figure 1:
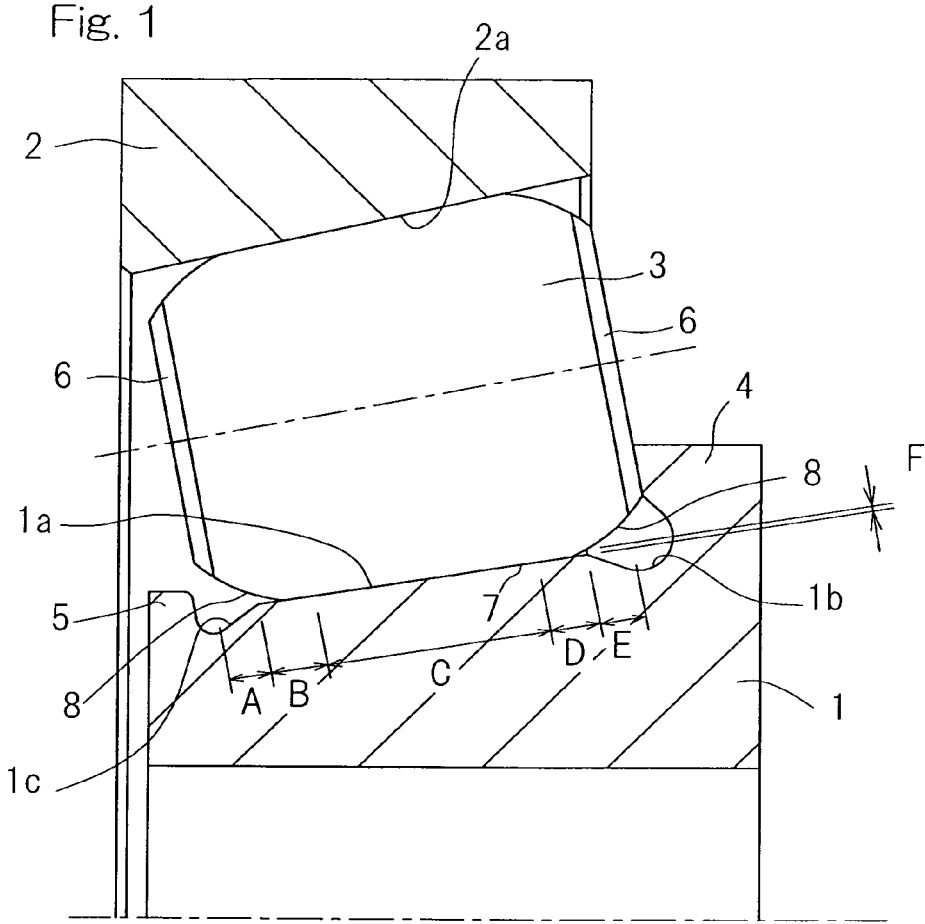
FIG. 1 is a schematic sectional view of an important portion of a tapered roller bearing assembly according to a first preferred embodiment of the present invention.

The tapered roller bearing assembly according to the first embodiment of the present invention includes, as best shown in FIG. 1, an inner ring 1, an outer ring 2 and a plurality of tapered rollers 3 between the inner ring 1 and the outer ring 2. The inner ring 1 has an outer periphery formed with an inner ring raceway surface 1a having a radially outwardly protruding large collar 4, defined at a large diameter side thereof, and a radially outwardly protruding small collar 5 defined at a small diameter side thereof. A corner area delimited between the inner ring raceway surface 1a and the large collar 4 has a generally radially inwardly depressed, first grinding undercut 1b defined therein and the opposite corner area delimited between the inner ring raceway surface 1a and the small collar 5 similarly has a generally radially inwardly depressed, second grinding undercut 1c defined therein. The inner ring raceway surface 1a has its generatrix extending in a direction axially of the inner ring 1, which generatrix is represented by a straight line. The outer ring 2 has an inner periphery formed with an outer ring raceway surface 2a held in face-to-face relation with the inner ring raceway surface 1a and having no collar, the generatrix of such outer ring raceway surface 2a being represented by a straight line extending in a direction axially of the outer ring 2.

Figure 2:
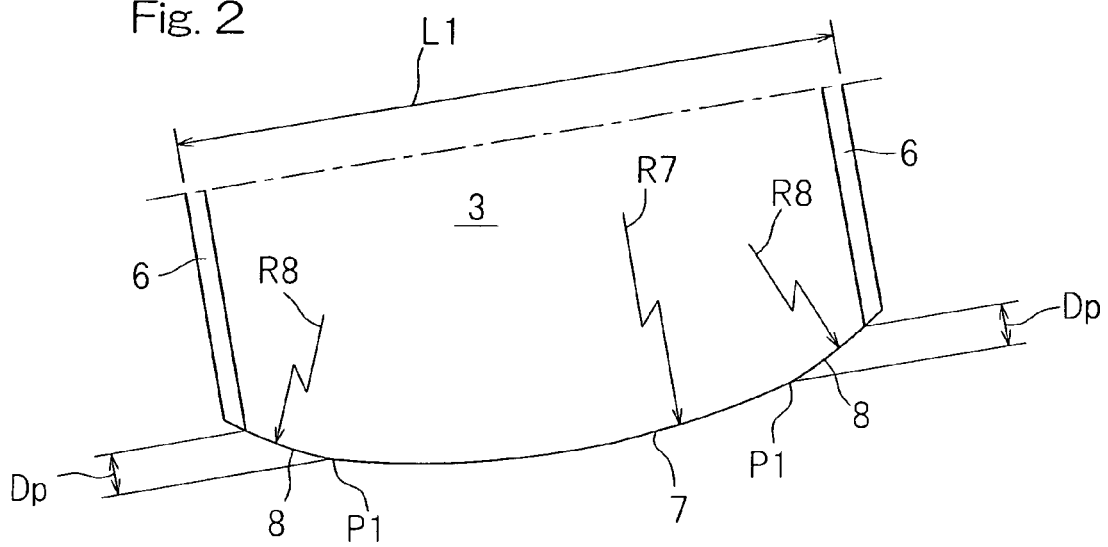
FIG. 2 is a schematic diagram showing the crowning profile in each roller of the tapered roller bearing assembly on a somewhat enlarged scale.

As shown in FIGS. 1 and 2, each of the tapered rollers 3 employed in the tapered roller assembly to which the present invention pertains has a crowning profile formed in a roller rolling surface defined in an outer periphery such roller 3, with opposite ends of such roller 3 being chamfered to have respective chamfers 6 and 6. That portion of the rolling surface of each tapered roller 3, where the crowning profile is defined, is formed into a contact area crowned portion 7 and a non-contact area crowned portion 8. Of them, the contact area crowned portion 7 lies within an axial region of the inner ring raceway surface 1a and is to be held in contact with such inner ring raceway surface 1a. On the other hand, the non-contact area crowned portion 8 lies outside the axial region of the inner ring raceway surface 1a and is held in non-contact with the inner ring raceway surface 1a, i.e., does not contact with the inner ring raceway surface 1a.

The contact area crowned portion 7 and the non-contact area crowned portion 8 have their generatrices extending in an axial direction of the respective roller 3, which generatrices are represented by corresponding continuous lines represented by different functions and continued smoothly at a connection point P1. The curvature R8 of the generatrix of the non-contact area crowned portion 8 in the vicinity of the connection point P1 is chosen to be smaller than the curvature R7 of the generatrix of the contact area crowned portion 7.

In the meantime, in the tapered roller bearing assembly, the contact area on the side of the inner ring 1 and the contact area on the side of the outer ring 2 have such a relationship that a relatively high contact pressure tends to develop on the side of the inner ring 1 because the equivalent radius is relatively small. In other words, in the tapered roller bearing assembly, the equivalent radius of the contact area on the side of the inner ring 1 is smaller than the equivalent radius of the contact area on the side of the outer ring 2 and, therefore, the contact pressure at the contact area on the side of the inner ring 1 tends to become higher than the contact area on the side of the outer ring 2. Accordingly, in designing the crowning profile in the practice of the present invention, it is sufficient to examine the contact taking place on the side of the inner ring 1.

The tapered roller bearing assembly, having the bearing number of 30316, will now be examined, assuming that a radial load effective to 35% of the basic dynamic load rating acts on such bearing assembly and such bearing assembly has a misalignment of $1/600$. Because of the misalignment referred to above, the contact pressure is assumed to be higher on the large diameter side of the roller of the roller 3 than on the small diameter side of the roller 3. The basis dynamic load rating referred to above is the load enough to permit the rated lifetime to attain one million revolutions, the direction and magnitude of which do not change when a group of the same bearing assemblies are operated individually under the condition, in which the inner ring 1 is rotated while the outer ring 2 is halted. The misalignment referred to above is a offset in axis between a shaft, on which the inner ring 1 is mounted, and a housing (not shown) supporting the outer ring 2 and is expressed by the fraction referred to above as an amount of inclination.

The generatrix of the contact area crowned portion 7 referred to above is formed by a logarithmic curve of a logarithmic crowning profile expressed by the following formula;

$$z(y) = A\ln\frac{1}{1-\left\{1-\exp\left(-\frac{z_m}{A}\right)\right\}\left(\frac{y-a}{K_2 a}+1\right)^2}$$

Wherein:
A represents $2K_1 Q/\pi/E'$;
a represents the effective length of the observatory site (as defined in FIG. 1);
E' represents the equivalent Young's modulus;
$K_1$ represents a design parameter for the crowning profile, which in turn represents a value descriptive of the multiplication of the design load Q and which also represents a value geometrically descriptive of the extent of curvature of the crowned portion;
$K_2$ represents a design parameter for the crowning profile, which in turn represents a value descriptive of the proportion of the crowning length relative to the effective length a of the observatory site;
l represents the effective length (as defined in FIG. 1);
Q represents the load in the normal direction;

y represents the position of the contact area in the direction of the generatrix;

z(y) represents the drop amount at the axial position y; and $z_m$ represents a design parameter for the crowning profile (as defined in FIG. 1), which in turn represents the drop amount at the effective length end.

In order to secure the processing precision of the crowning profile, the outer periphery of the roller 3 has a straight portion which preferably occupies ½ or more of the entire length L1 of the roller. Accordingly, if ½ of the entire length L1 of the roller is rendered to be that straight portion and a portion of the roller on the small diameter side and another portion of the roller on the large diameter side represent respective crowned portions of a symmetrical shape with respect to the point intermediate in the roller axial direction, of the various design parameters employed in the logarithmic crowning formula, $K_2$ will be fixed and $K_1$ and $z_m$ will become a subject of the design.

Figure 3A:
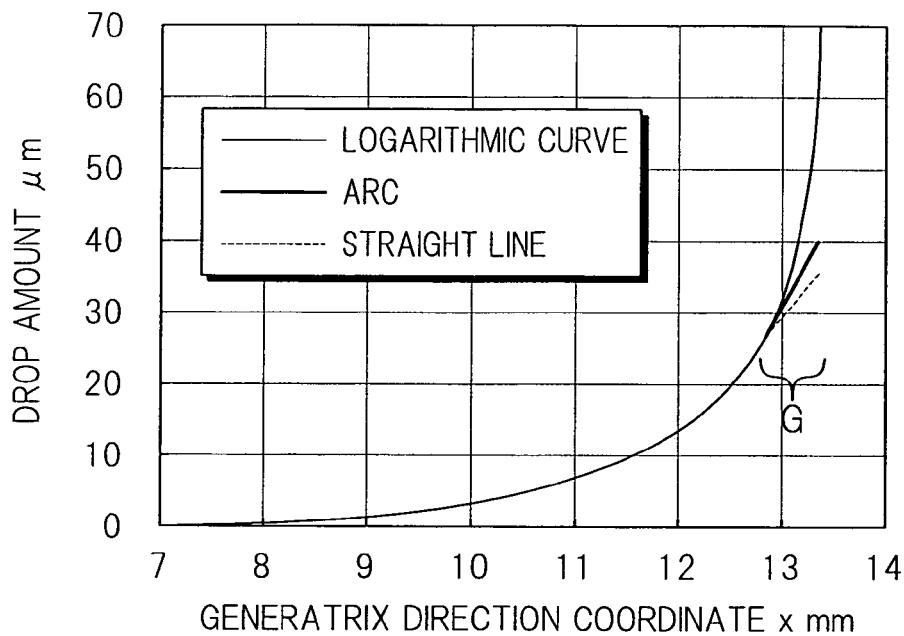
FIG. 3A is a chart showing the relationship between the coordinate of a tapered roller, taken in a direction of the generatrix of the tapered roller, and the amount of drop.

In the meantime, if the crowning profile is optimized with the use of the mathematical optimization technique as will be described later, in under such condition, the crowning profile such as expressed by the "logarithm" shown in FIG. 3A may result. At this time, the maximum drop amount of the crowning profile of the roller 3 is 69 μm. However, a region indicated by G in the chart of FIG. 3A is a region E,A opposed to each of the grinding undercuts 1b and 1c in the inner ring 1 as best shown in FIG. 1 and does not contact the inner ring 1. For this reason, the region G of the roller 3 need not be represented by the logarithmic crowning profile and there should be no problem even though such region G may be expressed by the straight or arcuate line or any other function. Even when the region G of the roller 3 is expressed by the straight or arcuate line or any other function, the same contact pressure distribution will be exhibited as is the case with the roller in its entirety represented by the logarithmic crowning profile and, hence, there should be no problem in functionality.

The mathematical optimization technique of the logarithmic crowning profile will now be discussed.

If the parameters $K_1$ and $z_m$, both employed in the functional formula expressive of the logarithmic crowning profile are properly chosen, the optimum logarithmic crowning profile can be designed.

The crowning profile is generally so designed as to reduce the maximum value of the stress or contact pressure at the contact area. In the instance now under discussion, it is assumed that a rolling fatigue life occurs in accordance with von Mises yield criterion and, hence, the parameters $K_1$ and $z_m$ are so chosen as to minimize the maximum value of von Mises stress.

The parameters $K_1$ and $z_m$ can be selected with the use of a proper mathematical optimization technique. Various algorithms have hitherto been suggested with regard to the mathematical optimization technique, but a direct search algorithm, which one of those algorithms, makes it possible to execute the optimization with no differential coefficient of function used and is useful particularly where the objective function and the variable cannot be directly expressed by mathematical formulas. In the instance now under discussion, using the Rosenbrock method, which is one of the direct search algorithms, the optimum values of the parameters $K_1$ and $z_m$ are determined.

Figure 3B:
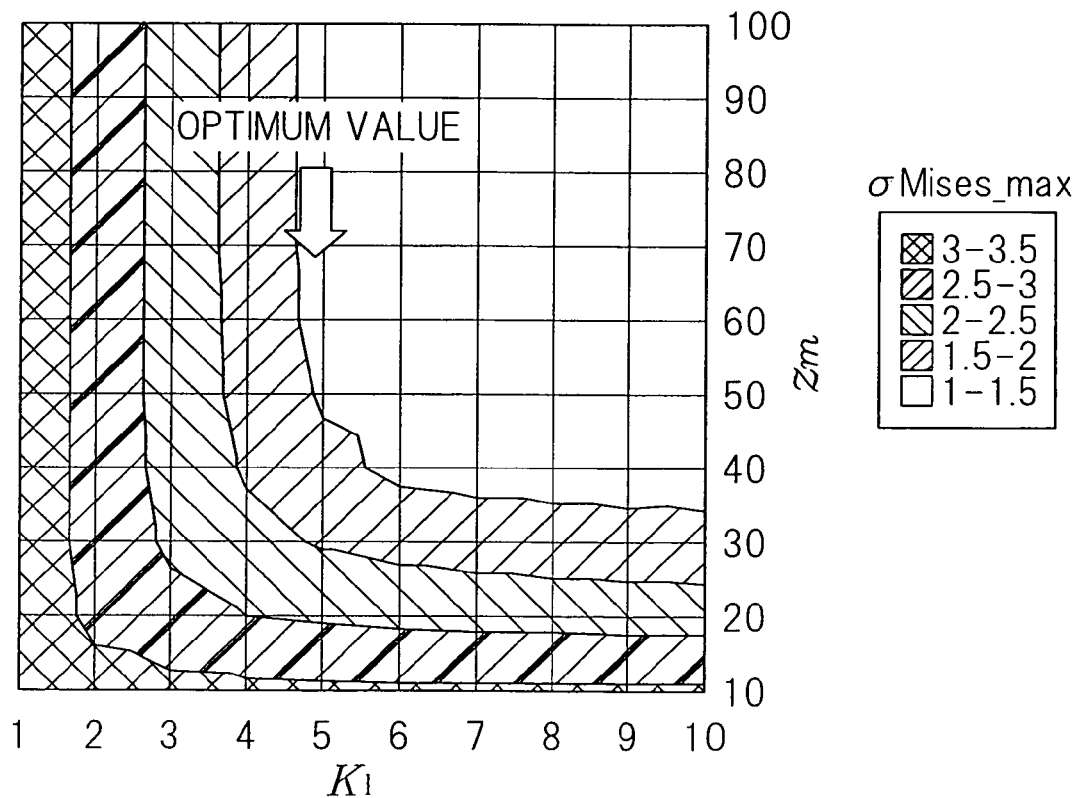
FIG. 3B is a chart showing the relationship between the maximum value of von Mises stress and a logarithmical crowning parameter.

Under the previously described operating conditions, that is, where the radial load effective to 35% of the basic dynamic load rating acts on the tapered roller bearing assembly, having the bearing number of 30316, and the misalignment is 1/600, the maximum value $S_{Mises\_max}$ of von Mises stress and the logarithmic crowning parameters $K_1$ and $z_m$ assume such a relationship as shown in FIG. 3B. If proper initial values are given to the parameters $K_1$ and $z_m$ and those parameters $K_1$ and $z_m$ are modified according to the rules of the Rosenbrock method, such a combination of the optimum values in FIG. 3B will result and the maximum value $s_{Mises\_max}$ will become minimum.

Whereas so long as the contact between the roller 3 and the inner ring 1 is considered, the crowning profile in the region G shown in FIG. 3A may be of any suitable profile, so long as the contact between the roller 3 and the outer ring 2 and/or formability by the grindstone at machining are/is taken into consideration, it is not desirable that at the connection point P1 with the logarithmically crowned portion, the region G represents a gradient smaller than that of the logarithmically crowned portion. Since the drop amount will increase when the gradient greater than the gradient of the logarithmically crowned portion is given to the crowning profile in the region G, this is also undesirable. In other words, it is desirable that the crowned portion in the region G and the logarithmically crowned portion should be so designed as to continue smoothly with each other while their gradients match with each other at the connection point P1 thereof. Referring to FIG. 3A, for the purpose of illustration, the crowned portion of the roller 3 in the region G is shown by the dotted line when represented by a straight line and the crowned portion of the same in the region G is shown by the bold solid line when represented by an arcuate line. When the crowning profile in the region G is chosen to be a straight line, the drop amount Dp of the crowning profile of the roller 3 will be, for example, 36 μm. On the other hand, when the crowning profile in the region G is chosen to be an arcuate line, the drop amount Dp of the crowning profile of the roller 3 will be, for example, 40 μm.

According to the tapered roller bearing assembly of the design hereinabove described, since the crowned profile is employed in the roller rolling surface in the outer periphery of each of the rollers 3, the grindstone can be caused to work on the roller rolling surface sufficiently to the extent as needed as compared with the use of the crowning profile only in the inner ring raceway surface. Accordingly, any possible processing defect to the rolling surface can be prevented. Thanks to the crowning profile employed in the roller rolling surface, the contact pressure and the stress at the contact area can be reduced to increase the working lifetime of the tapered roller bearing assembly. Also, since the curvature R8 of the generatrix of the non-contact area crowned portion 8 in the vicinity of the point P1 of connection between the contact area crowned portion 7 and the non-contact area crowned portion 8 is smaller than the curvature R7 of the generatrix of the contact area crowned portion 7, the drop amount Dp at each of the opposite ends of the roller 3 can be reduced. Accordingly, the grinding amount can be suppressed as compared with that in, for example, the single arcuate crowning profile hitherto employed and the machining efficiency of the roller 3 can be increased to allow the cost of manufacture to be reduced.

Figure 4:
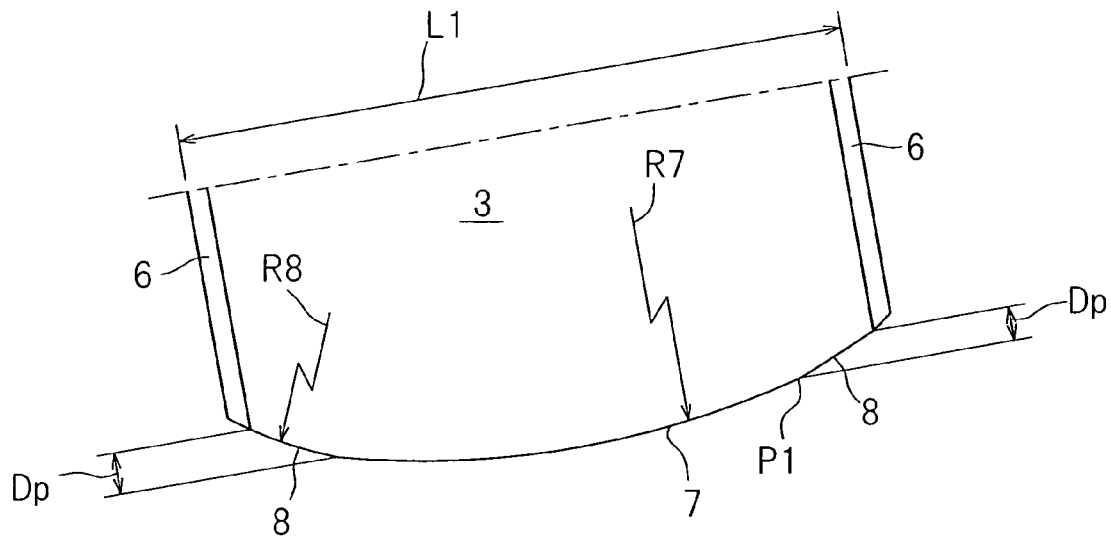
FIG. 4 is a schematic diagram showing, on a somewhat enlarged scale, the crowning profile in each roller of the tapered roller bearing assembly according to a second preferred embodiment of the present invention.

The generatrix of the non-contact area crowned portion 8 may have one or both of portions at the large and small diameter sides, which is/are represented by an arcuate line. In such case, rather than the generatrix of the roller rolling surface in its entirety expressed by, for example, a logarithmic curve, the drop amount Dp can be reduced. Accordingly, the grinding amount can be reduced. As is the case with a second preferred embodiment of the present invention as shown in FIG. 4, the generatrix of the non-contact area crowned portion 8 referred to above may have one or both of portions at the large and small diameter sides, which is/are represented by a straight line. (In the case of the second embodiment of the present invention shown in FIG. 4, that portion of the generatrix of the non-contact area crowned portion 8 at only the large diameter side is represented by the straight line.) In such case, the drop amount Dp can be further reduced as compared with that afforded when the generatrix of the non-contact area crowned portion 8 is represented by the arcuate line.

A portion or the whole of the generatrix of the contact area crowned portion 7 may be represented by the logarithmic crowning profile. Thanks to the contact area crowned portion 7 expressed by the logarithmic crowning profile, the contact pressure and the stress at the contact area can be reduced to permit the tapered roller bearing assembly to have an extended service life.

Figure 5:
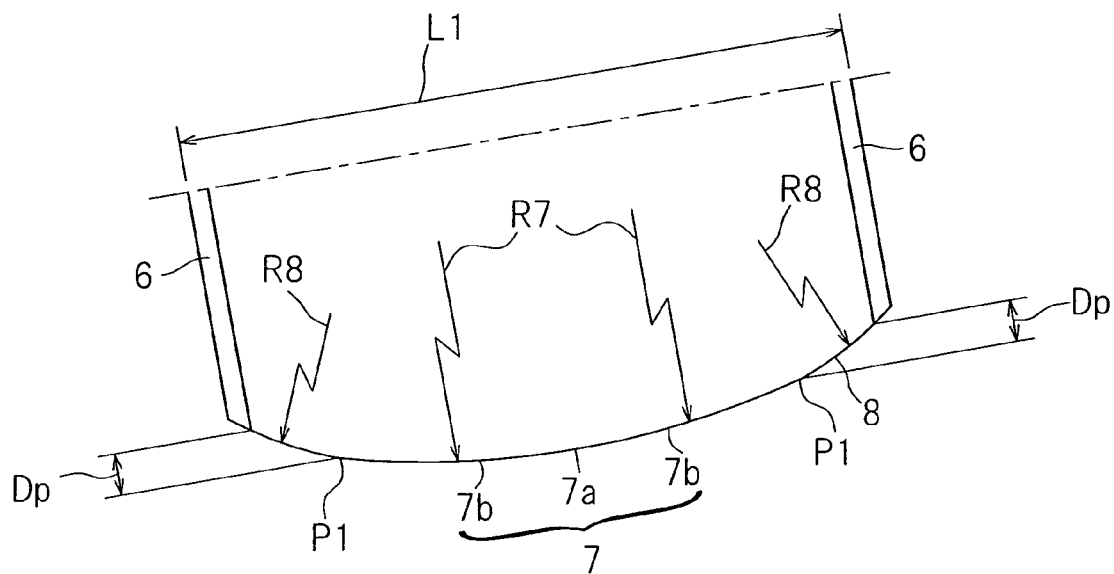
FIG. 5 is a schematic diagram showing, on a somewhat enlarged scale, the crowning profile in each roller of the tapered roller bearing assembly according to a third preferred embodiment of the present invention.

As is the case with a third preferred embodiment of the present invention as shown in FIG. 5, the generatrix of the contact area crowned portion 7 may be expressed by a straight portion 7a, formed in a flat shape along the axial direction of the roller, and a portion 7b formed by a logarithmic curve of the logarithmic crowning profile.

Figure 6:
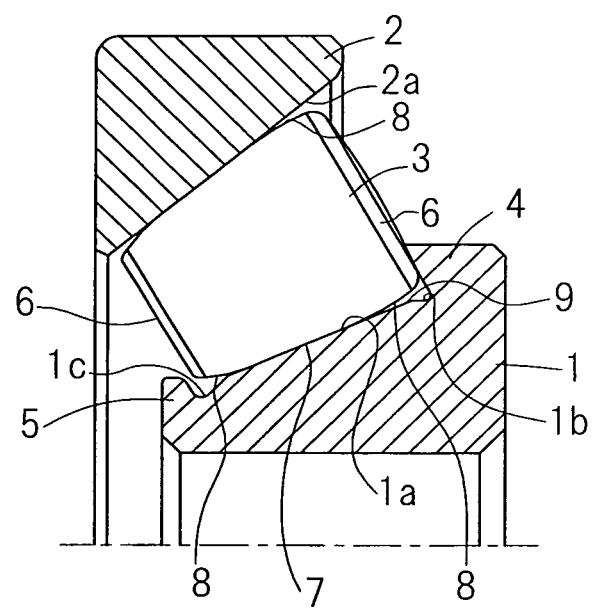
FIG. 6 is a schematic diagram showing, on a somewhat enlarged scale, the crowning profile in each roller of the tapered roller bearing assembly according to a fourth preferred embodiment of the present invention.

As a fourth preferred embodiment of the present invention, the crowning profile may be employed in both of the rollers 3 and the inner ring 1 as shown in FIG. 6. The crowned portion 9 in the inner ring 1 is shown in FIG. 6. In this case, the sum of the drop amount of the roller 3 and the drop amount of the inner ring 1 is so tailored as to be equal to the previously described optimized drop amount. Thanks to those crowning profiles, the contact pressure and the stress at the contact area can be reduced to increase the service life of the tapered roller bearing assembly. In addition, the grinding amount can be reduced to a value smaller than that resulting from the conventional signal arcuate crowning profile and the machining efficiency of the roller 3 can be increased to thereby reduce the cost of manufacture.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Inner ring
1a . . . Inner ring raceway surface
2 . . . Outer ring
3 . . Roller
7 . . . Contact area crowned portion
8 . . . Non-contact area crowned portion
L1 . . . Entire length of roller
P1 . . . Point of connection
R7, R8 . . . Curvature

What is claimed is:

1. A tapered roller bearing assembly including inner and outer rings, inner and outer ring raceway surfaces, and a plurality of rollers, in which a crowning profile is formed in a roller rolling surface in an outer periphery of at least each roller, the crowning profile including a crowning profile formed portion of the roller rolling surface comprising:
a contact area crowned portion, which lies within an axial range of the inner ring raceway surface and is held in contact with the inner ring raceway surface; and
a non-contact area crowned portion which lies outside the axial range of the inner ring raceway surface and is held in non-contact with the inner ring raceway surface, the non-contact area crowned portion being configured not to contact the inner ring raceway surface under all load conditions of the tapered roller bearing assembly,
wherein the contact area crowned portion and the non-contact area crowned portion have their generatrices extending in an axial direction of the roller, the generatrices being represented by corresponding continuous lines represented by different functions and continued smoothly at a point of connection, and
a curvature of the generatrix of the non-contact area crowned portion in the vicinity of the connection point is chosen to be smaller than a curvature of the generatrix of the contact area crowned portion.

2. The tapered roller bearing assembly as claimed in claim 1, wherein the generatrix of the non-contact area crowned portion has one or both portions at a large and small diameter sides represented by an arcuate line.

3. The tapered roller bearing assembly as claimed in claim 1, wherein the generatrix of the non-contact area crowned portion has one or both portions at a large and small diameter sides represented by a straight line.

4. The tapered roller bearing assembly as claimed in claim 1, wherein a portion or the whole of the generatrix of the contact area crowned portion is represented by a logarithmic crowning profile.

5. The tapered roller bearing assembly as claimed in claim 4, wherein the generatrix of the contact area crowned portion comprises a straight portion, formed in a flat shape along an axial direction of the roller, and a portion formed by a logarithmic curve of the logarithmic crowning profile.

6. The tapered roller bearing assembly as claimed in claim 5, wherein the straight portion has a length which is ½ or more of the entire length of the roller.

7. The tapered roller bearing assembly as claimed in claim 4, the generatrix of the non-contact area crowned portion includes a connection with a portion formed by a logarithmic curve of the logarithmic crowning profile matched with the gradient of the logarithmic curve.

8. The tapered roller bearing assembly as claimed in claim 4, wherein the generatrix of the contact area crowned portion is formed by a logarithmic curve of the logarithmic crowning profile expressed by the following formula:

$$z(y) = A\ln\frac{1}{1-\left\{1-\exp\left(-\frac{z_m}{A}\right)\right\}\left(\frac{y-a}{K_2 a}+1\right)^2}$$

where
A represents $2K_1 Q/\pi l E'$;
a represents the effective length of the observatory site;
E' represents the equivalent Young's modulus;
$K_1$ represents a design parameter for the crowning profile, which in turn represents a value descriptive of the multiplication of the design load Q and which also represents a value geometrically descriptive of the extent of curvature of the crowned portion;
$K_2$ represents a design parameter for the crowning profile, which in turn represents a value descriptive of the proportion of the crowning length relative to the effective length a of the observatory site;
I represents the effective length;
Q represents the load in the normal direction;
y represents the position of the contact area in the direction of the generatrix;

z(y) represents the drop amount at the axial position y; and $z_m$ represents a design parameter for the crowning profile, which in turn represents the drop amount at the effective length end.

9. The tapered roller bearing assembly as claimed in claim 8, wherein in the formula recited in claim 8, at least parameters $K_1$ and $z_m$ are optimally designed by the use of a mathematical optimization technique.

10. The tapered roller bearing assembly as claimed in claim 8, wherein a crowning profile is formed in the inner ring raceway surface and the sum of a drop amount of the crowning profile of the inner ring raceway surface and a drop amount of the crowning profile of an outer periphery of the roller is chosen to attain a predetermined value.

* * * * *